US009535503B2

(12) United States Patent
Gärdenfors et al.

(10) Patent No.: US 9,535,503 B2
(45) Date of Patent: Jan. 3, 2017

(54) METHODS AND DEVICES FOR SIMULTANEOUS MULTI-TOUCH INPUT

(71) Applicant: BlackBerry Limited, Waterloo (CA)

(72) Inventors: Dan Zacharias Gärdenfors, Malmö (SE); Lars Oskar Alexandersson, Malmö (SE)

(73) Assignee: BlackBerry Limited, Waterloo, Ontario (CA)

( * ) Notice: Subject to any disclaimer, the term of this patent is extended or adjusted under 35 U.S.C. 154(b) by 673 days.

(21) Appl. No.: 13/753,293

(22) Filed: Jan. 29, 2013

(65) Prior Publication Data

US 2014/0215336 A1 Jul. 31, 2014

(51) Int. Cl.
*G06F 3/033* (2013.01)
*G06F 3/01* (2006.01)
*G06F 3/0488* (2013.01)

(52) U.S. Cl.
CPC ........... *G06F 3/017* (2013.01); *G06F 3/04883* (2013.01); *G06F 2203/04808* (2013.01)

(58) Field of Classification Search
CPC ... G06F 3/04855; G06F 3/0481; G06F 3/0485
See application file for complete search history.

(56) References Cited

U.S. PATENT DOCUMENTS

| | | | |
|---|---|---|---|
| 7,353,232 B1* | 4/2008 | Kalucha et al. | 705/64 |
| 8,504,008 B1* | 8/2013 | Gossweiler et al. | 455/420 |
| 2006/0271287 A1* | 11/2006 | Gold et al. | 701/211 |
| 2006/0284852 A1* | 12/2006 | Hofmeister | G06F 3/0483 345/173 |
| 2007/0061729 A1* | 3/2007 | Terada | 715/727 |
| 2007/0139513 A1* | 6/2007 | Fang | 348/14.01 |
| 2008/0307323 A1* | 12/2008 | Coffman et al. | 715/753 |
| 2009/0249244 A1* | 10/2009 | Robinson et al. | 715/781 |
| 2010/0036967 A1* | 2/2010 | Caine et al. | 709/236 |
| 2010/0053110 A1* | 3/2010 | Carpenter et al. | 345/173 |
| 2011/0107223 A1* | 5/2011 | Tilton et al. | 715/730 |
| 2011/0157046 A1* | 6/2011 | Lee et al. | 345/173 |

(Continued)

OTHER PUBLICATIONS

Kevin Michaluk, "Brainstorming BB10: You control the OS . . . it doesn't control you", http://crackberry.com/brainstorming - bb10 - you - control - os - it - doesnt - control - you, dated Oct. 27, 2012, accessed Jan. 30, 2013, 12 pages.

*Primary Examiner* — Di Xiao
(74) *Attorney, Agent, or Firm* — Fish & Richardson P.C.

(57) ABSTRACT

Methods and device for simultaneous multi-touch input on a touchscreen display are described. In one aspect, the present application describes a method implemented by a processor of an electronic device. The electronic device has a touchscreen display. The method includes detecting a first touch gesture on a first portion of the touchscreen display associated with a first control element and, during the first touch gesture, detecting a second touch gesture on a second portion of the touchscreen display associated with a second control element different from the first control element; and while detecting the first touch gesture and detecting the second touch gesture, simultaneously, causing a first event in the first portion of the touchscreen display in response to the first touch gesture, and causing a second event in the second portion of the touchscreen display in response to the second touch gesture.

19 Claims, 6 Drawing Sheets

(56) References Cited

U.S. PATENT DOCUMENTS

| | | | |
|---|---|---|---|
| 2011/0209057 A1* | 8/2011 | Hinckley et al. | 715/702 |
| 2012/0054673 A1* | 3/2012 | Kim et al. | 715/784 |
| 2012/0314018 A1* | 12/2012 | Wengrovitz et al. | 348/14.08 |
| 2013/0104017 A1* | 4/2013 | Ko | G06F 3/0483 715/205 |
| 2013/0227490 A1* | 8/2013 | Thorsander | G06F 3/04883 715/841 |

* cited by examiner

METHODS AND DEVICES FOR SIMULTANEOUS MULTI-TOUCH INPUT

TECHNICAL FIELD

The present application relates to user interface management and more particularly to methods and electronic devices for manipulating display pages of user interfaces displayed on a touchscreen display using simultaneous multi-touch input.

BACKGROUND

Electronic devices such as smartphones and tablet computers are equipped or associated with various input interfaces. More particularly, current electronic devices are usually equipped with a touchscreen display. A touchscreen display provides a touch-sensitive input surface for receiving gesture-based input. Accordingly, a user may input instructions to the electronic device by inputting gestures on the touchscreen display to cause the electronic device to perform associated functions.

The gesture-based inputs allow a user to interact with user interfaces of applications within the electronic devices. These gesture-based inputs correspond to instructions to perform various functions and features within the user interfaces. For example, a user interface of an application may provide a display page that may be manipulated based on the gesture-based inputs of a user. For example, the display page may be scrolled, interface elements included in the display page may be selected, content included in the display page may be selected and copied, etc.

A user interface of an application may display multiple display pages. In such examples, a user may interact with all of the display pages to manipulate them. However, when interacting with multiple display pages, a user may need to "switch" between the display pages to interact with them and may not "simultaneously" interact with all of them (i.e. the user interface may only allow for one display page to be activated and manipulated at a time, while the other display pages are de-activated and cannot be manipulated).

For example, where the first touch of a multi-touch gesture (e.g. pinch-to-zoom) is detected, the location of that first touch associates the gesture with a particular portion of the interface, i.e. a control element. Thereafter, additional touches that are detected during the first touch (e.g. a received finger gesture) are assigned to the same control element irrespective of where they occur on the touchscreen display. That is, only one control element is active at a time.

BRIEF DESCRIPTION OF THE DRAWINGS

Reference will now be made, by way of example, to the accompanying drawings which show example embodiments of the present application, and in which.

Like reference numerals are used in the drawings to denote like elements and features.

DETAILED DESCRIPTION

In one aspect, the present application describes a method implemented by a processor of an electronic device. The electronic device has a touchscreen display. The method includes detecting a first touch gesture on a first portion of the touchscreen display associated with a first control element and, during the first touch gesture, detecting a second touch gesture on a second portion of the touchscreen display associated with a second control element different from the first control element; and while detecting the first touch gesture and detecting the second touch gesture, simultaneously, causing a first event in the first portion of the touchscreen display in response to the first touch gesture, and causing a second event in the second portion of the touchscreen display in response to the second touch gesture.

In another aspect, the present application describes an electronic device. The electronic device includes a memory and a touchscreen display. The electronic device also includes a processor coupled with the memory and the touchscreen display. The processor is configured to detect a first touch gesture on a first portion of the touchscreen display associated with a first control element and, during the first touch gesture, detect a second touch gesture on a second portion of the touchscreen display associated with a second control element different from the first control element; and while detecting the first touch gesture and detecting the second touch gesture, simultaneously, cause a first event in the first portion of the touchscreen display in response to the first touch gesture, and cause a second event in the second portion of the touchscreen display in response to the second touch gesture.

In yet another aspect, the present application describes a computer readable storage medium. The computer readable storage medium includes computer executable instructions which, when executed, configure a processor to detect a first touch gesture on a first portion of a touchscreen display associated with a first control element and, during the first touch gesture, detect a second touch gesture on a second portion of the touchscreen display associated with a second control element different from the first control element; and while detecting the first touch gesture and detecting the second touch gesture, simultaneously, cause a first event in the first portion of the touchscreen display in response to the first touch gesture, and cause a second event in the second portion of the touchscreen display in response to the second touch gesture.

Other example embodiments of the present disclosure will be apparent to those of ordinary skill in the art from a review of the following detailed description in conjunction with the drawings.

Example embodiments of the present disclosure are not limited to any particular operating system, electronic device architecture, server architecture or computer programming language.

Example Electronic Device

Figure 1:
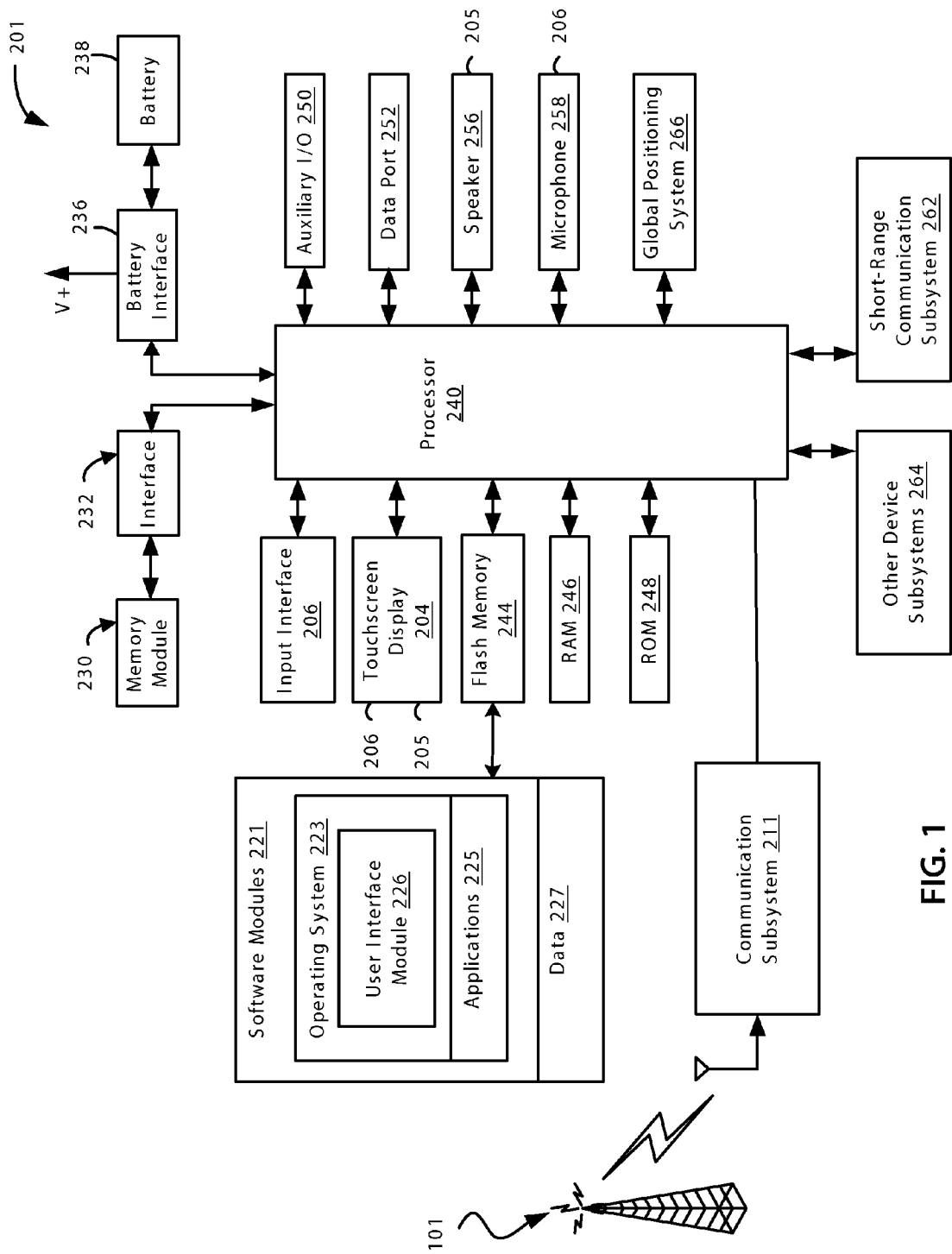
FIG. 1 is a block diagram illustrating an example electronic device.

Reference is first made to FIG. 1 which illustrates an example electronic device 201. In the illustrated example embodiment, the electronic device 201 is a communication device, such as a mobile communication device. In at least some example embodiments, the electronic device 201 is a two-way communication device having data and voice communication capabilities, and the capability to communicate with other computer systems, for example, via the Internet. Depending on the functionality provided by the electronic device 201, in various example embodiments, the electronic device 201 may be a multiple-mode communication device configured for data and voice communications, a mobile telephone such as a smart phone, a tablet computer such as a slate computer, a wearable computer such as a watch, a PDA (personal digital assistant), or a computer system. In other example embodiments, the electronic device 201 may be of a type not specifically listed above.

The electronic device 201 includes a housing (not shown), housing the components of the electronic device 201. The internal components of the electronic device 201 are constructed on a printed circuit board (PCB). The electronic device 201 includes a controller including at least one processor 240 (such as a microprocessor) which controls the overall operation of the electronic device 201. It will be appreciated that, in at least some example embodiments, the controller may, instead of or in addition to the processor 240, include an analog circuit or other types of circuits capable of performing a part or all of the functions of the processor 240 that are described herein. The processor 240 interacts with device subsystems such as a wireless communication subsystem 211 for exchanging radio frequency signals with a wireless network 101 to perform communication functions. The processor 240 interacts with additional device subsystems including one or more input interfaces 206 (such as a keyboard, one or more control buttons, one or more microphones 258, and/or a touch-sensitive overlay associated with a touchscreen display 204), flash memory 244, random access memory (RAM) 246, read only memory (ROM) 248, auxiliary input/output (I/O) subsystems 250, a data port 252 (which may be a serial data port, such as a Universal Serial Bus (USB) data port), one or more output interfaces 205 (such as the touchscreen display 204, one or more speakers 256, or other output interfaces 205), a short-range communication subsystem 262, a global positioning system (GPS) 266 for communicating with a GPS satellite network, and other device subsystems generally designated as 264. Some of the subsystems shown in FIG. 1 perform communication-related functions, whereas other subsystems may provide "resident" or on-device functions.

The electronic device 201 includes a touchscreen display 204. The touchscreen display 204 may be constructed using a touch-sensitive input surface connected to an electronic controller. The touch-sensitive input surface overlays the touchscreen display 204 and may be referred to as a touch-sensitive overlay. The touch-sensitive overlay and the electronic controller provide a touch-sensitive input interface 206 and the processor 240 interacts with the touch-sensitive overlay via the electronic controller. That is, the touchscreen display 204 acts as both an input interface 206 and an output interface 205.

The electronic device 201 is connected to a communication network such as a wireless network 101 which may include one or more of a Wireless Wide Area Network (WWAN) and a Wireless Local Area Network (WLAN) or other suitable network arrangements. In at least some example embodiments, the electronic device 201 is configured to communicate over both the WWAN and WLAN, and to roam between these networks. In at least some example embodiments, the wireless network 101 may include multiple WWANs and WLANs.

The particular design of the wireless communication subsystem 211 depends on the wireless network 101 in which the electronic device 201 is intended to operate. The electronic device 201 may send and receive communication signals over the wireless network 101 after the required network registration or activation procedures have been completed.

In at least some example embodiments, the auxiliary input/output (I/O) subsystems 250 may include an external communication link or interface, for example, an Ethernet connection. The electronic device 201 may include other wireless communication interfaces for communicating with other types of wireless networks, for example, a wireless network such as an orthogonal frequency division multiplexed (OFDM) network. The auxiliary I/O subsystems 250 may include a pointing or navigational tool (input device) such as a clickable trackball or scroll wheel or thumbwheel, or a vibrator for providing vibratory notifications in response to various events on the electronic device 201 such as receipt of an electronic message or incoming phone call, or for other purposes such as haptic feedback (i.e. touch feedback).

In at least some example embodiments, the electronic device 201 also includes a removable memory module 230 (typically including flash memory) and a memory module interface 232. Network access may be associated with a subscriber or user of the electronic device 201 via the memory module 230, which may be a Subscriber Identity Module (SIM) card for use in a GSM network or other type of memory module for use in the relevant wireless network. The memory module 230 may be inserted in or connected to the memory module interface 232 of the electronic device 201 in order to operate in conjunction with the wireless network 101.

The electronic device 201 may store data 227 in an erasable persistent memory, which in one example embodiment is the flash memory 244. In various example embodiments, the data 227 may include service data having information required by the electronic device 201 to establish and maintain communication with the wireless network 101. The data 227 may also include user application data such as email messages, address book and contact information, calendar and schedule information, notepad documents, image files, and other commonly stored user information stored on the electronic device 201 by its user, and other data. The data 227 stored in the persistent memory (e.g. flash memory 244) of the electronic device 201 may be organized, at least partially, into a number of databases or data stores each containing data items of the same data type or associated with the same application. For example, email messages, contact records, and task items may be stored in individual databases within the memory of the electronic device 201.

In at least some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols.

The electronic device 201 also includes a battery 238 as a power source, which is typically one or more rechargeable batteries that may be charged, for example, through charging circuitry coupled to a battery interface 236 such as the serial data port 252. The battery 238 provides electrical power to at least some of the electrical circuitry in the electronic device 201, and the battery interface 236 provides a mechanical and electrical connection for the battery 238.

The battery interface 236 is coupled to a regulator (not shown) which provides power V+ to the circuitry of the electronic device 201.

The short-range communication subsystem 262 is an additional optional component which provides for communication between the electronic device 201 and different systems or devices, which need not necessarily be similar devices. For example, the short-range communication subsystem 262 may include an infrared device and associated circuits and components, or a wireless bus protocol compliant communication mechanism such as a Bluetooth® communication module to provide for communication with similarly-enabled systems and devices.

In at least some example embodiments, the electronic device 201 may include a GPS 266. The GPS 266 communicates with a GPS compatible satellite network to provide location and time related information of the electronic device 201. For example, the GPS 266 may, in conjunction with an integrated or separate mapping application, provide current or past locations of the electronic device 201 on a map, notify a user of nearby landmarks on the map, provide driving directions and estimated travel time based on a current location and a planned destination, etc.

A pre-determined set of applications that control basic device operations, including data and possibly voice communication applications may be installed on the electronic device 201 during or after manufacture. Additional applications and/or upgrades to an operating system 223 or software applications 225 may also be loaded onto the electronic device 201 through the wireless network 101, the auxiliary I/O subsystem 250, the data port 252, the short-range communication subsystem 262, or other suitable device subsystems 264. The downloaded programs or code modules may be permanently installed, for example, written into the program memory (i.e. the flash memory 244), or written into and executed from the RAM 246 for execution by the processor 240 at runtime.

The processor 240 operates under stored program control and executes software modules 221 stored in memory such as persistent memory, for example, in the flash memory 244. As illustrated in FIG. 1, the software modules 221 include operating system software 223, and other software applications 225. In the example embodiment of FIG. 1, the operating system software 223 includes a user interface module 226 (i.e. the user interface module 226 is part of the operating system software 223). However, in other example embodiments, the user interface module 226 may be implemented as part of another application 225, or as a separate stand-alone application 225.

The electronic device 201 may include a range of additional software applications 225, including, for example, a notepad application, an email application, a presentation application, a web browser, a contact manager application (which may perform the functions of an address book and allow contact records to be created and stored), a calendar application (which may allow calendar events to be created and stored), a mapping application such as a GPS application (which may perform the operations of the GPS 266), a media player application, a video telephone application, an audio mixer application, or any combination thereof. Each of the software applications 225 may include layout information defining the placement of particular fields and graphic elements (for example, text fields, input fields, icons, etc.) in a graphical user interface (GUI) associated with the application. A GUI is a type of user interface that allows the user to interact with a device and/or an application utilizing images, icons, text and other selectable graphical elements. The GUI represents information and actions available to the user through graphical icons and visual indicators. The software applications 225 may also include touch gesture information defining functionalities associated with the touch gestures received via the touchscreen display 204. The touch gesture information may define GUI specific user input gestures to perform functions within the GUI. For example, a software application 224 may determine a finger swiping movement (i.e. a touch gesture) on the touchscreen display 204 as a scrolling function to navigate within the GUI (for example, scrolling a display page provided by the GUI).

The software modules 221 or parts thereof may be temporarily loaded into volatile memory such as the RAM 246. The RAM 246 is used for storing runtime data variables and other types of data or information. Although specific functions are described for various types of memory, this is merely one example, and a different assignment of functions to types of memory could also be used.

The user interface module 226 provides a platform for a user to interact with one or more software applications 225. For example, the user interface module 226 may function as a user interface for one or more associated software applications 225 (and provide one or more display pages that a user may interact with). The user interface module 226 may enable a user to execute the various functions and features of the associated one or more software applications 225.

In at least some example embodiments, the user interface module 226 may include information for manipulating a display page provided by the user interface module 226 for associated software applications 225 based on the instructions input by a user. For example, the user interface module 226 may include touch gesture information defining particular functionalities for manipulating the display page based on touch gestures received from a user on the touchscreen display 204. For example, the user interface module 226 may receive a touch gesture that is a swiping gesture on the touchscreen display 204, and in response, manipulate the display page based on the appropriate functionality of the swiping gesture. For example, in at least some example embodiments, the swiping gesture may correspond to a scrolling function and accordingly, cause the user interface module 226 to manipulate the display page by scrolling the display page.

The user interface module 226 may provide a plurality of display pages for one or more associated software applications 225 for interaction by a user. The plurality of display pages may be displayed simultaneously on the touchscreen display 204, and may be associated with one software application 225 or a plurality of software applications. In at least some example embodiments, each of the display pages may displayed as a "separate" display page. That is, a display page is displayed encompassed within a defined boundary. In such example embodiments, each of the display pages may be considered as a separate unit. Additionally, the boundaries encompassing a display page may be adjusted so that the display page may occupy a smaller or larger portion of the touchscreen display 204 when displayed. Although, a plurality of such display pages may be displayed on the touchscreen display 204, they may not all be fully visible (in relation to a display page, a fully visible display page is defined as when the overall page including all the content included in the page is displayed) simultaneously on the touchscreen display 204 due to the constraints in the dimensions of the touchscreen display 204. Accordingly, in at least some example embodiments, the touchscreen display 204 may display the display pages as overlapping one another (i.e. the display pages are layered). For example, a first display page may partially or fully cover a second display page with the covered portion of the second display page underneath the first display page. In such example embodiments, the activated display page may be uncovered and visible (however, the activated display page may not be "fully" visible as all of the content within the overall page may not be displayed; in such cases, the activated display page may need to be further scrolled to display content included in the page that is not currently displayed) on the touchscreen display 204 (which in this case is the first display page). Similarly, if the second display page is activated, the second display page will no longer be covered and instead be visible (in such a case, the second display page may now partially or fully cover the first display page). Accordingly, a user may interact with multiple display pages by first interacting with a displayed first display page and then "switching" to interact with a displayed second display page (the "switching" may, for example, be performed upon inputting an instruction by the user). That is, the first display page is initially activated and the second display page is de-activated, and after "switching", the second display page is activated and the first display page is de-activated. Accordingly, the display pages may be manipulated one at a time by a user.

Similar to above, in at least some example embodiments, the display pages may also be displayed as being "separate", however one or more of the display pages may be included within a separate "container" provided by the user interface module 226 that may be referred to as a window. Each window may include at least a display page and these windows may be adjustable and arranged on the touchscreen display 204 in the same manner as described above. For example, a window may be adjusted to change the display area occupied by the window (and accordingly, the display page included within the window) on the touchscreen display 204. Additionally, the windows may be displayed overlapping one another (i.e. the windows may be layered); with the "activated" window (and the "activated" display page(s)) displayed at the front of the touchscreen display 204, and covering at least a portion of the other "de-activated" windows (and the "de-activated" display page (s)). If a "de-activated" window is switched to being "activated", the previously "activated" window may be "de-activated", and the newly "activated" window may instead be displayed at the front of the touchscreen display 204 covering at least a portion of the previously "activated" window.

Although the present application uses the term "pages", it will be understood that in some contexts and implementations the term "pages" may be interchangeable with "windows", "layers" or other such terms.

In accordance with one aspect of the present application, multiple display pages (including multiple display pages included within windows) may be manipulated simultaneously by a user. That is, interaction of one display page may be simultaneous and independent of interaction of another display page. In such cases, both the display pages are active. A user may input instructions to both the display pages at the same time (the instructions input may correspond to similar or different functionalities), and in response, the display pages are simultaneously manipulated and independent of each other.

In at least some example embodiments, the display pages may be displayed within a split screen. That is, the display pages may be displayed as being divided in the form of adjacent parts with one or more dividers. In at least some example embodiments, the display pages may be fully visible within the split screen. However, in other example embodiments, only a portion of one or more of the display pages is visible due to the constraints in the dimensions of the touchscreen display 204. In such example embodiments, display pages in the form of adjacent parts may overlap one another, and for example, a first display page partially covering a second display page may need to be moved (i.e. slid from over the second display page) to display a greater portion of the partially covered second display page (in at least some example embodiments, moving (i.e. sliding) the first display page in an opposite direction may further cover the second display page). In such cases, a divider may be shifted allowing for the second display page to occupy a greater portion within the split screen while the first display page may now occupy a smaller portion within the split screen.

It will be appreciated that the display pages displayed within a split screen may be "temporary" or "permanent". A "temporary" split screen may be a transition state between a first display page and a second display page. For example, an input of a scrolling command may cause a transition state in which a portion of the first display page and a portion of the second display are visible on the display as the scrolling function is performed. While, a "permanent" split screen is a non-transition state in which the display pages are normally displayed in such a manner (i.e. even when no operations are being performed on the display pages). Similar to above, the display pages within the split screen may also be simultaneously manipulated and the manipulation of each of the display pages within the split screen is independent of each other. It will also be appreciated that the display pages within a split screen may be associated with the same or different software applications 225. Moreover, a transition state can be "held" by maintaining the touch gesture, e.g. starting a touch gesture to initiate a slide of a display page (for example, the first display page and the second display page) and then maintaining stationary contact with the display page holding it in partially slid position.

In such example embodiments, where the user interface module 226 allows for simultaneous manipulation of multiple display pages, the user interface module 226 may include multiple control elements. A control element is a touch point for receiving a touch gesture input from a user and based on the touch gesture, a corresponding function is performed on the electronic device 201. The control element associates the gesture to the corresponding function (or which may be referred to as "an event" as a plurality of functions may be performed by a plurality of gestures). In cases, where there is only one control element, and a user inputs a multi-touch gesture (i.e. a gesture which includes multiple points of contact on the touchscreen display), each of the points of contact is related to the one control element, and the gesture is associated with an event. That is, a multi-touch gesture relates to the same control element and the control element associates the multi-touch gesture to an event. In such example embodiments, only one display page may be manipulated at a time. However, in cases where there is a plurality of control elements, each control element may be related to a different gesture and associated with a different event. The conventional touchscreen display with multiple control elements, the user interface module 226 detects an initial touch and associates the touch with one of the control elements. Thereafter, additional touches are associated with the same control element until the gesture ends. Conversely, in the present application multiple control elements may be manipulated simultaneously and independently. In such example embodiments, each of the control elements may be associated with a different portion of the touchscreen display 204, and temporally overlapping gestures received at each of the different portions of the touchscreen display 204 are resolved independently by the user interface module 226 and associated with the respective control elements, and thus cause different events within these different portions.

For example, in at least some example embodiments, the user interface module 226 may detect a first touch gesture on a first portion of the touchscreen display 204 associated with a first control element and, during the first touch gesture, may also detect a second touch gesture on a second portion of the touchscreen display 204 associated with a second control element that is different from the first control element. The user interface module 226, while detecting the first touch gesture and the second touch gesture, may simultaneously, cause a first event in the first portion of the touchscreen display 204 in response to the first touch gesture, and cause a second event in the second portion of the touchscreen display 204 in response to the second touch gesture. In at least some example embodiments, the first control element may be associated with a first display page that is displayed on the first portion of the touchscreen display 204, and the second control element is associated with a second display page that is displayed on the second portion of the touchscreen display 204. In such example embodiments, the first event may include manipulating the first display page based on the first touch gesture input while the second event may include manipulating the second display page based on the second touch gesture input. Accordingly, a user may input two different gestures to manipulate two different display pages simultaneously and independent of each other. For example, gestures may be input to simultaneously scroll the display pages, select interface elements within the display pages, select and copy content within the display pages, etc. Such an ability to input different gestures on different portions of the touchscreen display 204 to simultaneously perform different events may be referred to as "chording" (i.e. as in striking different keys on a piano at the same time with each key strike producing a sound at the same time as the other key strikes).

Although the display pages may be independently manipulated from one another, in at least some example embodiments, the manipulation of the display pages may be correlated. For example, the first gesture may cause a portion of first content included in the first display page to be selected and copied while the second gesture may cause the selected and copied portion of the first content to be inserted in second content included in the second display page (i.e. a paste function is performed).

In at least some example embodiments, the user interface module 226 may only display one display page. In such example embodiments, portions of the display page may also be independently and simultaneously manipulated based on gestures input by the user on different portions of the display page. For example, the display page may be displayed to encompass the first portion and the second portion of the touchscreen display 204. The first control element is associated with a first portion of the display page displayed in the first portion of the touchscreen display 204, and the second control element is associated with a second portion of the display page displayed on the second portion of the touchscreen display 204. Accordingly, in such example embodiments, the first event may include manipulating the first portion of the display page based on the first touch gesture input on the first portion of the touchscreen display 204 while the second event may include manipulating the second portion of the display page based on the second touch gesture input on the second portion of the touchscreen display 204.

Accordingly, it will be appreciated that the display pages referred to as being manipulated by chording operations may encompass any type of display page provided by the user interface module 226, including, as described above, separate display pages with defined boundaries, display pages included within one or more windows, display pages within a split screen, etc.

Specific functions and features of the user interface module 226 will be discussed in greater detail below with reference to FIG. 2.

Additionally, as mentioned above, the user interface module 226 may be associated with one or more software applications 225. Accordingly, the functions of "chording" may be implemented by the user interface module 226 with respect to a variety of different applications such as an email application, a calendar application, a presentation application, a contact manager application, a media player application, a video telephone application, a mapping application, a web browser, a social media application, etc. Greater details of such implementations will be provided below with respect to FIGS. 3-6.

It will be appreciated that in at least some example embodiments, the operating system 223 may perform some or all of the functions of the user interface module 226. In other example embodiments, the functions or a portion of the functions of the user interface module 226 may be performed by one or more other applications. Further, while the user interface module 226 has been illustrated as a single block, the user interface module 226 may include a plurality of software modules. In at least some example embodiments, these software modules may be divided among multiple applications.

Manipulating Display Pages

Figure 2:
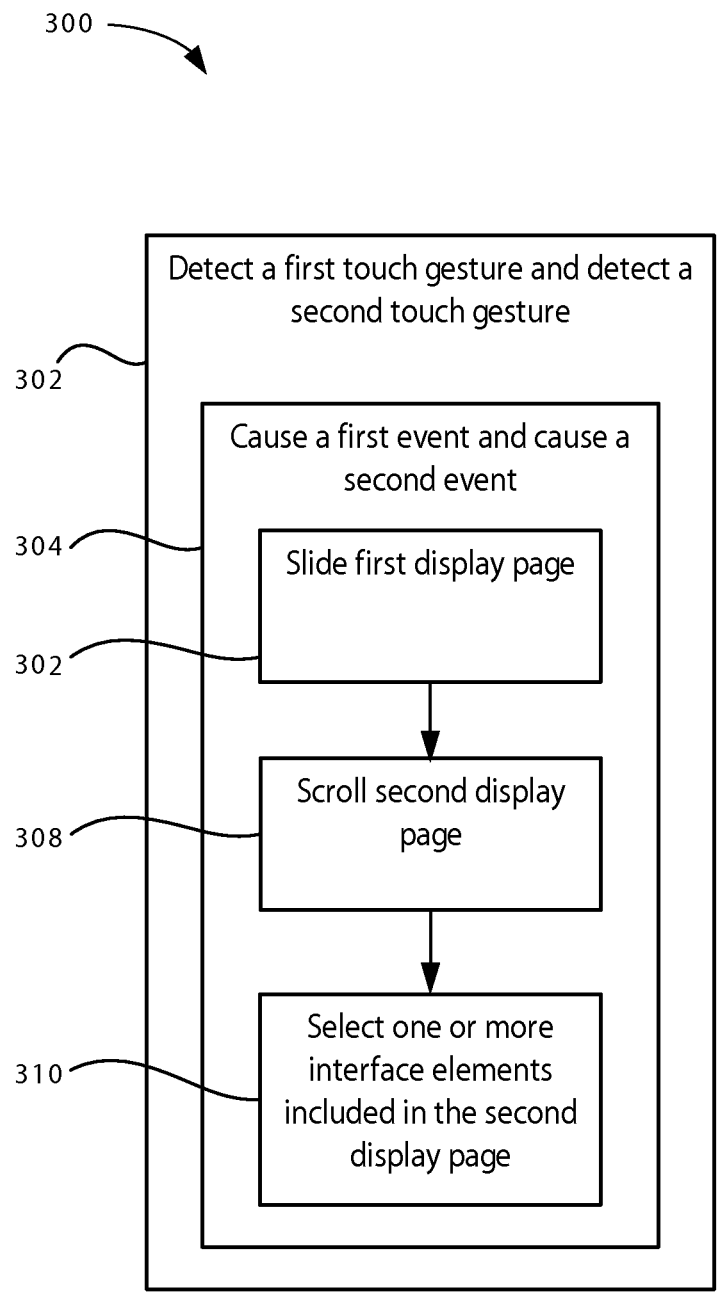
FIG. 2 is a flowchart illustrating an example method of manipulating display pages.

Referring now to FIG. 2, a flowchart of an example method 300 of manipulating display pages is illustrated. The electronic device 201 (FIG. 1) may be configured to perform the method 300 of FIG. 2. In at least some example embodiments, the processor 240 (FIG. 1) of the electronic device 201 is configured to perform the method 300 of FIG. 2. One or more applications 225 (FIG. 1) or modules on the electronic device 201 may contain computer readable instructions which cause the processor 240 of the electronic device 201 to perform the method 300 of FIG. 2. In at least some example embodiments, the user interface module 226 (FIG. 1) stored in memory of the electronic device 201 is configured to perform the method 300 of FIG. 2. More particularly, the user interface module 226 may contain computer readable instructions which, when executed, cause the processor 240 to perform the method 300 of FIG. 2. It will be appreciated that the method 300 of FIG. 2 may, in at least some example embodiments, be provided by other software applications 225 or modules apart from those specifically discussed above, such as the operating system 223 (FIG. 1). Accordingly, any features which are referred to as being performed by the electronic device 201 may be performed by any one or more of the software applications 225 or modules referred to above or other software modules.

In at least some example embodiments, at least some of the method 300 of FIG. 2 may be performed by or may rely on other applications 225 or modules which interface with the user interface module 226. For example, the user interface module 226 may be equipped with an application programming interface (API) which allows other software applications 225 or modules to access features of the user interface module 226.

The method 300 includes, at 302, the electronic device 201 detecting a first touch gesture on a first portion of the touchscreen display 204 associated with a first control element and, during the first touch gesture, detecting a second touch gesture on a second portion of the touchscreen display 204 associated with a second control element. As mentioned above, the control element is a touch point or area for receiving a touch gesture within a defined region of the touchscreen display 204. That is, a touch gesture needs to be performed within the defined region for it to be associated with, i.e. received by, the control element. Accordingly, the first portion of the touchscreen display 204 defines the region for which the first control element may receive the first touch gesture, while the second portion of the touchscreen display 204 defines the region for which the second control element may receive the second touch gesture.

The electronic device 201 may detect a first touch gesture on a first portion of the touchscreen display 204. That is, the electronic device 201 may detect the input of a gesture on the first portion of the touchscreen display 204. For example, a user may perform a gesture on the first portion of the touchscreen display 204 which is detected by the electronic device 201. The gesture input may be caused by a finger, hand and/or other physical body part of a user on the first portion of the touchscreen display 204. In at least some example embodiments, the gesture input may be received by an input device, such as a stylus, on the first portion of the touchscreen display 204.

The gesture input may be any type of gesture recognized by the electronic device 201. As mentioned above, in at least some example embodiments, the electronic device 201 may include pre-determined gesture information defining functionalities associated with a number of different gestures (in at least some example embodiments, the pre-determined gesture information may be stored, for example, in the memory of the electronic device 201). Accordingly, in detecting a first touch gesture, the electronic device 201 may determine whether the gesture input corresponds to a pre-determined gesture included in the electronic device 201. For example, the electronic device 201 may retrieve a list of pre-determined gestures stored in the memory of the electronic device 201, and compare the gesture input to the list of pre-determined gestures. If the gesture input matches at least one of the pre-determined gestures in the list, the electronic device 201 may detect a first touch gesture.

During the first touch gesture, the electronic device 201 may detect a second touch gesture on a second portion of the touchscreen display 204. For example, a user may continue to input a gesture (such as, pressing the first portion of the touchscreen display 204) which is detected by the electronic device 201, and simultaneously, input another gesture on the second portion of the touchscreen display 204 which is detected by the electronic device 201. Accordingly, the second touch gesture is performed on the second portion of the touchscreen display 204 while the first touch gesture is being performed on the first portion of the touchscreen display 204. The second touch gesture may be input and detected in the same manner as the first touch gesture, which is described in greater detail above.

At 304, while detecting the first touch gesture and the second touch gesture, the electronic device 201 may simultaneously, cause a first event in the first portion of the touchscreen display 204 in response to the first touch gesture, and cause a second event in the second portion of the touchscreen display 204 in response to the second touch gesture. That is, as gestures are input on each of the first portion and the second portion of the touchscreen display 204, a first event occurs in the first portion and a second event occurs in the second portion simultaneously and independent of one another, in response to these gestures. For example, a user may input a first touch gesture on the first portion of the touchscreen display 204 (for example, by pressing the first portion with a finger), and while inputting the first touch gesture (for example, by continuing to press the first portion with the finger), input a second touch gesture on the second portion of the touchscreen display (for example, by pressing the second portion with a different finger). The electronic device 201 detects these two gestures, and in response to these two gestures, simultaneously causes a first event in the first portion of the touchscreen display 204 and a second event in the second portion of the touchscreen. The event performed depends on the command that a gesture input corresponds to. For example, if the gesture input corresponds to a scrolling command, the event performed is a scrolling function. Further example embodiments of different events are discussed below.

In at least some example embodiments, a first display page is displayed on the first portion of the touchscreen display 204, and a second display page is displayed on the second portion of the touchscreen display 204. In such example embodiments, the first control element is associated with the first display page, and the second control element is associated with the second display page. As a control element is a touch point, a display page defines the region of the touch point, and gestures performed within the display page all relate to the control element associated with the particular display page. Accordingly, gestures (such as, the first touch gesture and the second touch gesture) may be simultaneously received on the first portion of the touchscreen display 204 which the first control element associates with an event (i.e. the first event), and on the second portion of the touchscreen display 204 which the second control element associates with a different event (i.e. the second event).

In such example embodiments, at 306, the first touch gesture may correspond to a sliding command to slide the first display page. The display pages may be displayed as "separate" display pages or within a split screen. In either example embodiment, the first display page may overlap at least a portion of the second display. For example, a user may input a gesture (for example, the user may perform a horizontal swipe movement relative to the first display page on the first portion of the touchscreen display 204) that corresponds to a slide command to slide the first display page from over the second display page. The slide motion may be for moving the first display page "off-screen". The slide gesture may be "held" (a "slide-and-hold") while the first display page is partly slid off-screen such that a portion of the first display page remains visible and a portion of the second display page is also now visible since the first display page no longer occupies the entire screen. In at least some example embodiments, this sliding gesture may be performed while the user performs another gesture on the second portion of the touchscreen display 204 that displays the second display page. In response, the electronic device 201 slides the first display page from over the second display page to display at least the portion of the overlapped second display page. Accordingly, in such example embodiments, the first event includes sliding of the first display page from over the second display page to display at least the portion of the overlapped second display page.

By sliding the first display page from the over the second display page, a greater portion of the second display page is visible as the second display page now occupies a greater portion of the touchscreen display (while the first display page may now occupy a smaller portion of the touchscreen display). In such cases, the second portion of the touchscreen display 204 which displays the second display page may also define a greater area of the touchscreen display 204 while the first portion of the touchscreen display 204 which displays the first display page may now define a smaller area of the touchscreen display 204.

At 308, the second touch gesture may correspond to a scrolling command to scroll the second display page. Scrolling is the process of graphically moving a display page up, down, diagonally or across a display (or a portion of the display) of the electronic device 201. By scrolling a display page, a user may access all of the content on the second display page.

It will be appreciated that the scrolling function is differentiated from the sliding function in that the scrolling function graphically moves a display page to display different content included in the display page (i.e. different portions of a display page are displayed) and may or may not change the area of the touchscreen display 204 the display page encompasses (for example, a scrolling function causing movement between display pages may change the area encompassed); while a sliding function may or may not change the display of content included in the display page, but changes the area of the touchscreen display 204 the display page encompass (for example, the area of the first portion of the display page that displays the first display page is changed by a sliding function). Accordingly, for example, the user may input a gesture (for example, the user may perform a vertical swipe movement relative to the second display page on the second portion of the touchscreen display 204) that corresponds to a scrolling command to scroll the second display page.

In at least some example embodiments, where the electronic device 201 may have initially slid the first display page (as described at 306) at least partway off-screen, the user may then perform the second touch gesture which corresponds to the scrolling command to scroll the second display page while maintaining the sliding gesture, for example by maintaining touch contact with the first display page in order to "hold" it in a partially slid position. In such example embodiments, the scrolling gesture is performed while the user continues to perform the first touch gesture (for example, as the user may have performed a sliding gesture) on the first portion of the touchscreen display 204 that displays the first display page. In response, the electronic device 201 scrolls the second display page. Accordingly, in such example embodiments, the second event includes scrolling the second display page.

In at least some example embodiments, the second display page may include one or more interface elements. An interface element is a specific type of control element. More specifically, the interface element is a user selectable portion of the touchscreen display 204, and may, for example, include a button, bar (such as a slide bar), icon, text, hyperlink, etc. area within the touchscreen display 204 which may be selected. The interface elements may be associated with one or more functionalities. Accordingly, a selection of an interface element may initiate the associated functionality on the electronic device 201. In such example embodiments, at 310, the second touch gesture may correspond to a selection command to select the one or more interface elements included in the second display page. For example, the user may input a gesture (for example, the user may tap an area of the second portion of the touchscreen display 204 that displays the one or more interface elements) that corresponds to a selection command to select the one or more interface elements. In response, the electronic device 201 selects the one or more interface elements. Accordingly, in such example embodiments, the second event includes selecting the one or more interface elements. As mentioned above, in at least some example embodiments, the interface elements may be associated with one or more functionalities; accordingly, the selection of the one or more interface elements may cause the electronic device 201 to perform the one or more associated functions.

In the example embodiments already illustrated, the manipulation of the display pages based on the gestures input are separate and independent of one another. However, in at least some example embodiments, the manipulation of the display pages based on the gestures input, although still independent, are correlated. For example, the first display page may include first content and the second display page may include second content. In such example embodiments, the first touch gesture may correspond to a selection command to select at least a portion of the first content and the first touch gesture may also correspond to a copy command to copy the selected portion of the first content (copying is the duplication of information. For example, the copying command may be a command to duplicate the selected portion of the first content without removing the selected portion). For example, the user may input a gesture (for example, the user may perform a continuous press and directional movement on an area of the first portion of the touchscreen display 204 that displays the portion of the first content to be selected) that corresponds to a selection command to select at least a portion of the first content, and subsequently, continue inputting the gesture (for example, the user may now perform a continuous press on the area of the first portion of the touchscreen display 204 that displays the selected portion of the first content) to instead correspond to a copy command to copy the selected portion of the first content. In at least some example embodiments, the selection of the portion of the first content may alter the graphical features of the selected portion. That is, the selected portion may visually appear different after selection. For example, in at least some example embodiments, the selected portion may have an effect applied to it (such as, by changing the colour of the selected portion, highlighting the selected portion, darkening the selected portion, resizing the selected portion, etc.) to visually distinguish it from the non-selected portions of the first content. In at least some other example embodiments, rather than applying an effect to the selected portion, an effect is applied to the non-selected portion (similarly, the non-selected portions may be changed in colour, highlighted, darkened or dimmed, resized, etc.) to visually distinguish the selected portion from the non-selected portion.

In at least some example embodiments (where the first display page may be completely or partially overlapping the second display page), after the selection and copy gestures are performed, a further slide and hold gesture may be performed to slide the first display page from over the second display page and to maintain the first display page at the partially slid position so that at least a portion of the second display page and the first display page are displayed on the touchscreen display (for example, the user may perform a horizontal swipe and press gesture on the first portion of the touchscreen display displaying the first display page to input a slide and hold command).

While the first touch gesture that corresponds to the selection command, the copy command and/or the slide and hold command is being performed, a second touch gesture is performed that corresponds to an insert command to insert the copied portion of the first content in the second content of the second display page. For example, the user may input a gesture (for example, the user may perform a continuous press on an area of the second portion of the touchscreen display 204 that displays second content) that corresponds to an insert command to insert the copied portion of the first content in the second content of the second display page.

In response to these gestures, the electronic device 201 selects the portion of the first content, copies the selected portion of the first content, slides and holds the first display page, and inserts the copied portion of the first content in the second content. Accordingly, in such example embodiments, the first event includes selecting the portion of the first content from the first display page, and copying the selected portion of the first content; while the second event includes inserting the copied portion of the first content in the second content of the second display page.

In at least some example embodiments, prior to the second touch gesture corresponding to an insert command, the second touch gesture corresponds to a scrolling command to scroll the second display page. That is, the second touch gesture may first be input as a scroll command and then as an insert command. For example, the user may input a gesture (for example, the user may perform a vertical swipe movement relative to the second display page on the second portion of the touchscreen display 204) that corresponds to a scroll command to scroll the second display page. In response, the electronic device 201 scrolls the second display page. Accordingly, in such example embodiments, the second event includes scrolling the second display page. The scrolling gesture may be ended and changed to an inserting gesture when the second display page is scrolled to display the portion of the second content in which the copied portion of the first content is to be inserted. That is, the user may continue to perform the second touch gesture to correspond to an inserting command (such as, a long press) from a scrolling command (such as, a vertical swipe movement).

It will be appreciated that in at least some example embodiments, rather than the first touch gesture being a copy gesture and the second touch gesture being an insert gesture, other gestures corresponding to different functions may be performed after at least a portion of the first content is selected. For example, instead of the copy gesture, a cut gesture may be performed (which corresponds to permanently removing the selected portion of the first content from the first display page) and in such example embodiments, the insert gesture may remain the same of inserting the selected and cut portion of the first content in the second content of the second display page. However, in at least some example embodiments, the second gesture may be a select gesture to select at least a portion of the second content, and then may be an insert gesture to replace the selected portion of the second content of the second display page with the selected and cut portion of the first content (that is, the selected portion of the second content is deleted and replaced with the selected portion of the first content).

Accordingly, in at least some example embodiments, the first touch gesture may be associated with a plurality of gestures corresponding to different inputs that cause functionalities defining a first event. Similarly, the second touch gesture may also be associated with a plurality of gestures corresponding to different inputs that cause functionalities defining a second event. Additionally, the first event and the second event may be terminated when gestures are no longer being simultaneously detected on the first portion and the second portion of the touchscreen display 204.

It will be appreciated that other gestures may be input in either the first portion or the second portion of the touchscreen display 204 that correspond to commands to perform other functionalities (for example, cut and paste functions, tagging functions, merging functions, etc.). The functions performed may depend upon the application user interfaces that provide the first display page and the second display page (the display pages may be associated with the same application or a different application). Additionally, gestures to perform corresponding functions may be input in any combination on the first portion and the second portion of the touchscreen display 204.

As mentioned above, the "chording" operations may be implemented with respect to a variety of applications. Greater details of such implementations will be provided below with respect to FIGS. 3 to 6.

Example Display Pages

Reference is next made to FIGS. 3 to 6 which show example embodiments of a first display page and a second display page on the touchscreen display 204 of the electronic device 201. More particularly, FIGS. 3 to 6 illustrate the display pages of various applications implementing the "chording" operations described in method 300 of FIG. 2.

Figure 3:
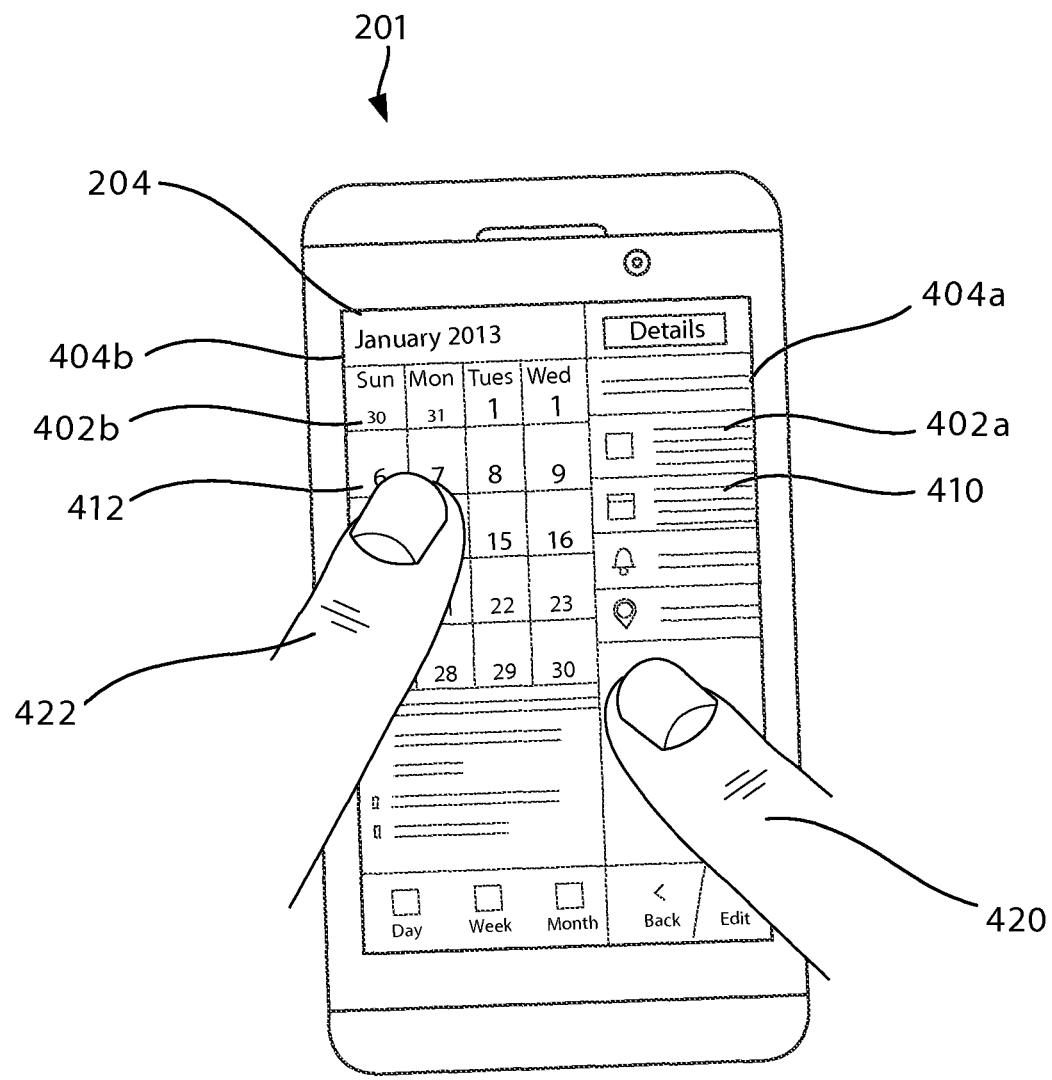
FIG. 3 is an example embodiment of an example first display page and an example second display page displayed on a touchscreen display.

Referring first to FIG. 3 which shows an example embodiment of an example first display page 402a on a first portion 404a of the touchscreen display 204 of the electronic device 201, and also a second display page 402b on a second portion 404b of the touchscreen display 204 of the electronic device 201. The display pages may be provided by a user interface (e.g. a GUI) for one or more associated applications 225 (FIG. 1). In the illustrated example of FIG. 3, the display pages are provided by a user interface for a calendar application (such as, Microsoft Outlook®). A calendar application may allow events to be created. An event is an appointment and may include one or more event-characteristics that define information about the appointment (such as, a subject, location, reminder, start time, end time, etc.). The calendar application may also include a calendar which may be provided in different views (such as, a day view, a week view, a month view, and/or a year view). The calendar events are associated with the calendar. For example, the calendar may include an identifier (for example, a particular day entry) and an associated interface element that is associated with the calendar event. Accordingly, a selection of the interface element on the calendar (for example, by an input from a user via an input interface 206) may display the associated calendar event.

In the illustrated example of FIG. 3, the first display page 402a is a calendar event 410 and the second display page 402b is a calendar 412 that is associated with the calendar event 410. The first display page 402a (i.e. the calendar event 410) is shown to overlap a portion of the second display page 402b (i.e. the calendar 412). The calendar 412 may include an identifier (such as, the Jan. 12, 2013 entry) and an associated interface element that is associated with the calendar event 410. A user may have selected the interface element (for example, by inputting a selection gesture on the touchscreen display 204), and in response, the electronic device 201 displays the calendar event 410 on the first portion 404a of the touchscreen display 204, and displays the calendar 412 on the second portion 404b of the touchscreen display 204.

In such example embodiments, the first portion 404a including the first display page 402a is associated with a first control element, and the second portion 404b including the second display page 402b is associated with a second control element. Accordingly, chording operations may be performed such that the first portion 404a including the first display page 402a defines the region for receiving a first touch gesture 420 that is related to the first control element to be associated with a first event; and the second portion 404b including the second display page 402b defines the region for receiving a second touch gesture 422 that is related to the second control element to be associated with a second event. In the illustrated example, the user inputs the first touch gesture 420 on the first portion 404a (for example, the user horizontally swipes and then maintains stationary contact with the first portion 404a displaying the calendar event 410) so as to move it aside and reveal the second portion 404b, and while inputting the first touch gesture 420, the user inputs the second touch gesture 422 on the second portion 404b (for example, the user is performing a vertical swipe gesture on the second portion 404b displaying the calendar 412). The first touch gesture 420 may correspond to a slide and hold command (i.e. a command to slide the calendar event (by for example, performing a horizontal swipe) and maintain the display of the calendar event 410 in the partially slid position (by for example, maintaining stationary contact so that the first display page 404a (i.e. the calendar event 410) does not either slide out of view (i.e. off the touchscreen display 204) or snap back to cover the whole touchscreen display 204). While the second touch gesture 422 may correspond to a scroll command to scroll the calendar 412 to display other content included in the calendar 412. As the calendar 412 is displayed in a month view (shown as January 2013), further scrolling may display other months (such as, February 2013, March 2013, etc.). Accordingly, a user may interact with the calendar event 410 on the first portion 404a while scrolling the calendar 412 on the second portion 404b to display different portions of the calendar 412 (such as, the portion for the month of February 2013).

Similarly, in at least some example embodiments, the display pages are provided by a user interface for an email application (such as, Microsoft Outlook®). The email application may allow messages to be created and transmitted. Additionally, the email application may include a message list identify messages received at and sent from an email address associated with the email application. The message list may include one or more identifiers (for example, a sender name and a subject line associated with a message) and associate interface elements that are each associated with a message. A user may select an interface element (for example, by inputting a selection gesture on the touchscreen display 204), and in response, the electronic device 201 displays the associated email message.

In at least example embodiments, the first display page 402a may be a message and the second display page 402b may be a message list associated with the message (i.e. the message list includes an identifier and interface element associated with the message). Similarly, chording operations may be performed on the display pages. For example, the user may input the first touch gesture 420 on the first portion 404a displaying the message, for example, by horizontally swiping and then maintaining stationary contact with the first portion 404a to input a slide and hold command to maintain the display of the message in a partially slid position. While inputting the first touch gesture 420, the user inputs the second touch gesture 422 on the second portion 404b displaying the message list, for example, by vertically swiping the second portion 404b to input a scroll command to scroll the message list. Accordingly, a user may interact with the message on the first portion 404a while scrolling the message list on the second portion 404b to display different portions of the message list (such as, a portion including identifiers for older received and sent messages as the message list may be arranged by date of receipt and sending of messages).

In at least some example embodiments, the message list may additionally include notifications (in the form of identifiers and associated interface elements) that link to information received at other application 225 accounts associated with the particular email address. For example, a Gmail® message list for an associated Gmail® email address may include notifications for information received (such as, a "tweet") at a Twitter® account associated with the Gmail® email address. Accordingly, a selection of the interface element associated with the notification may display the Twitter® account including the information received (such as, the "tweet"). Accordingly, in such example embodiments, for example, the first display page 402a displayed on the first portion 404a may be associated with an email application, and may be a message list. While, the second display page 402b displayed on the second portion 404b may be associated with another application (such as a social media application), and may be an account page for the application. Similarly, a user may scroll the message list while interacting with the display of the account page for the application.

Similarly, in at least some example embodiments, the display pages are provided by a user interface for a presentation application (such as, Microsoft PowerPoint®). The presentation application may allow presentation slides to be created for display during a presentation. Additionally, the presentation application may display a presentation slide list identifying presentation slides for a presentation. The presentation slide list may include one or more identifiers (for example, a smaller version of each presentation slide) and associated interface elements that are each associated with a presentation slide. A user may select an interface element (for example, by inputting a selection gesture on the touchscreen display 204), and in response, the electronic device 201 displays the associated presentation slide.

In at least example embodiments, the first display page 402a may be a presentation slide and the second display page 402b may be a presentation slide list associated with the presentation slide (i.e. the presentation slide list includes an identifier and an interface element associated with the presentation slide). Similarly, chording operations may be performed on the display pages. For example, the user may input the first touch gesture 420 on the first portion 404a displaying the presentation slide, for example, by horizontally swiping and then maintaining stationary contact with the first portion 404a to input a slide and hold command to maintain the display of the presentation slide in a partially slid position. While inputting the first touch gesture 420, the user inputs the second touch gesture 422 on the second portion 404b displaying the presentation slide list, for example, by vertically swiping the second portion 404b to input a scroll command to scroll the presentation slide list. Accordingly, a user may interact with the presentation slide on the first portion 404a while scrolling the presentation slide list on the second portion 404b to display different portions of the presentation slide list (such as, a portion including identifiers for presentation slides to be presented at a later time during a presentation).

Similarly, in at least some example embodiments, the display pages are provided by a user interface for a contact manager application (such as, Microsoft Outlook®). A contact manager application may allow a user to create and modify contact records. A contact record includes contact information identifying a contact. Additionally, the contact manager application may display a contact list identifying contacts. The contact list may include one or more identifiers (for example, a name and/or phone number associated with each contact) and associated interface elements that are each associated with a contact record. A user may select an interface element (for example, by inputting a selection gesture on the touchscreen display 204), and in response, the electronic device 201 displays the associated contact record.

In at least example embodiments, the first display page 402a may be a contact record and the second display page 402b may be a contact list associated with the contact record (i.e. the contact list includes an identifier and interface element associated with the contact record). Similarly, chording operations may be performed on the display pages. For example, the user may input the first touch gesture 420 on the first portion 404a displaying the contact record, for example, by for example, by horizontally swiping and then maintaining stationary contact with the first portion 404a to input a slide and hold command to maintain the display of the contact record in a partially slid position. While inputting the first touch gesture 420, the user inputs the second touch gesture 422 on the second portion 404b displaying the contact list, for example, by vertically swiping the second portion 404b to input a scroll command to scroll the contact list. Accordingly, a user may interact with the contact record on the first portion 404a while scrolling the contact list on the second portion 404b to display different portions of the contact list (such as, a portion including identifiers for contacts having surnames starting with later letters of the alphabet as the contacts within the contact list may be arranged alphabetically based on the surnames).

Additionally, it will be appreciated that other functions may be performed on the first display page and the second display page where the display pages are associated with a contact manager application. For example, in at least some example embodiments, a contact record displayed on the first portion 404a and a different contact record displayed on the second portion 404b may be merged with one another.

Figure 4:
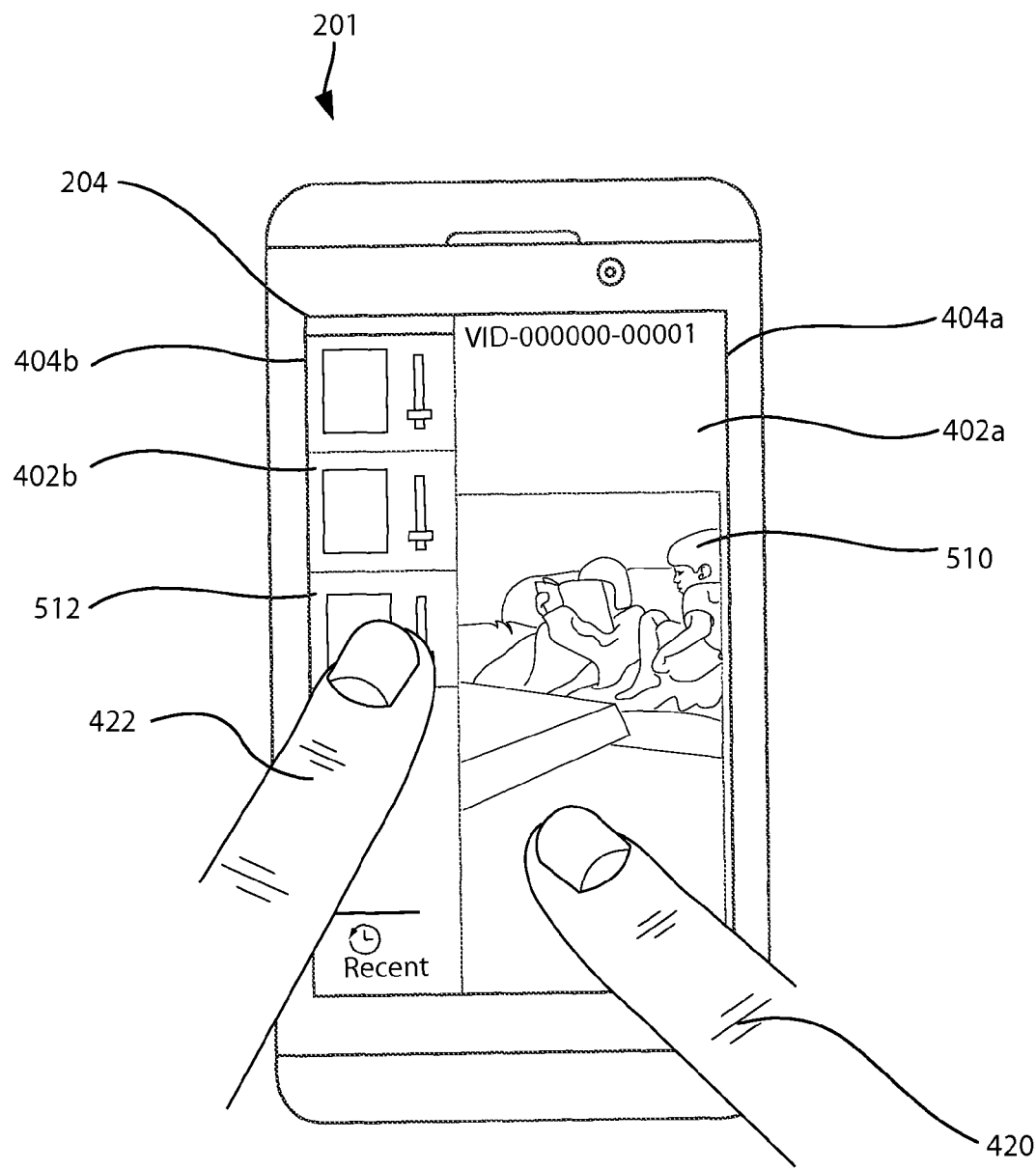
FIG. 4 is another example embodiment of the example first display and the second display page displayed on the touchscreen display.

Reference is next made to FIG. 4 which shows another example embodiment of the example first display page 402a on the first portion 404a of the touchscreen display 204 of the electronic device 201, and also the second display page 402b on the second portion 404b of the touchscreen display 204 of the electronic device 201. In the illustrated example of FIG. 4, the display pages are provided by a user interface for a media player application (such as, Microsoft Windows Media Player®). A media player application may play, record and display multimedia files (multimedia is media content and may include a combination of text, audio, still images, animation and/or video content). The media player application may also provide a settings list including one or more settings related to the media content (such as, volume, brightness, contrast, picture quality, etc. settings associated with the media content). The one or more settings are associated with one or more interface elements, and a selection of the one or more interface elements (for example, by an input from a user via an input interface 206) may vary the associated settings of the media content (for example, the brightness of the displayed media content may be changed).

In the illustrated example of FIG. 4, the first display page 402a defines media content 510 (and more particularly, a video) and the second display page 402b defines a settings list 512 including one or more settings (not shown) associated with the media content 510. The one or more settings are associated with one or more selectable interface elements. The first display page 402a (i.e. the media content 510) is shown to overlap a portion of the second display page 402b (i.e. the settings list). Chording operations may be performed on the display pages. For example, the user may input the first touch gesture 420 on the first portion 404a displaying the media content 510, for example, by horizontally swiping and then maintaining stationary contact with the first portion 404a to input a slide and hold command to maintain the display of the media content in a partially slid position. While inputting the first touch gesture 420, the user inputs the second touch gesture 422 on the second portion 404b displaying the settings list 512, for example, by tapping an area of the second portion 404b corresponding to an interface element for an option setting to input a select command to select the interface element. Accordingly, a user may interact with the media content 510 on the first portion 404a while selecting the interface element for a setting to vary the associated setting of the media content 510 (for example, a selection of an interface element associated with a brightness setting may change the brightness of the displayed media content 510).

Similarly, in at least some example embodiments, the display pages are provided by a user interface for a video telephone application (such as, Skype®). A video telephone application allows for the reception and transmission of audio/video signals between electronic devices at different locations to allow users to communicate with one another at real-time. The video telephone application displays video content so that a user may view a real-time video of another user during communication. The video telephone application may also provide a settings list including one or more settings related to the video content (such as, volume, brightness, contrast, picture quality, etc. settings associated with the video content). The one or more settings are associated with one or more interface elements, and a selection of the one or more interface elements (for example, by an input from a user via an input interface 206) may vary the associated settings of the video content (for example, the brightness of the displayed media content may be changed).

In at least some example, the first display page 402a may define video content and the second display page 402b may define a settings list including one or more settings associated with the video content. The one or more settings are associated with one or more selectable interface elements. Similarly, chording operations may be performed on the display pages. For example, the user may input the first touch gesture 420 on the first portion 404a displaying the video content, for example, by horizontally swiping and then maintaining stationary contact with the first portion 404a to input a slide and hold command to maintain the display of the video content in a partially slid position. While inputting the first touch gesture 420, the user inputs the second touch gesture 422 on the second portion 404b displaying the settings list, for example, by tapping an area of the second portion 404b corresponding to an interface element for a setting to input a select command to select the interface element. Accordingly, a user may interact with the video content on the first portion 404a during a chat, while selecting the interface element for a setting to vary the associated setting of the video content (for example, a selection of an interface element associated with a brightness setting may change the brightness of the displayed video content).

Figure 5:
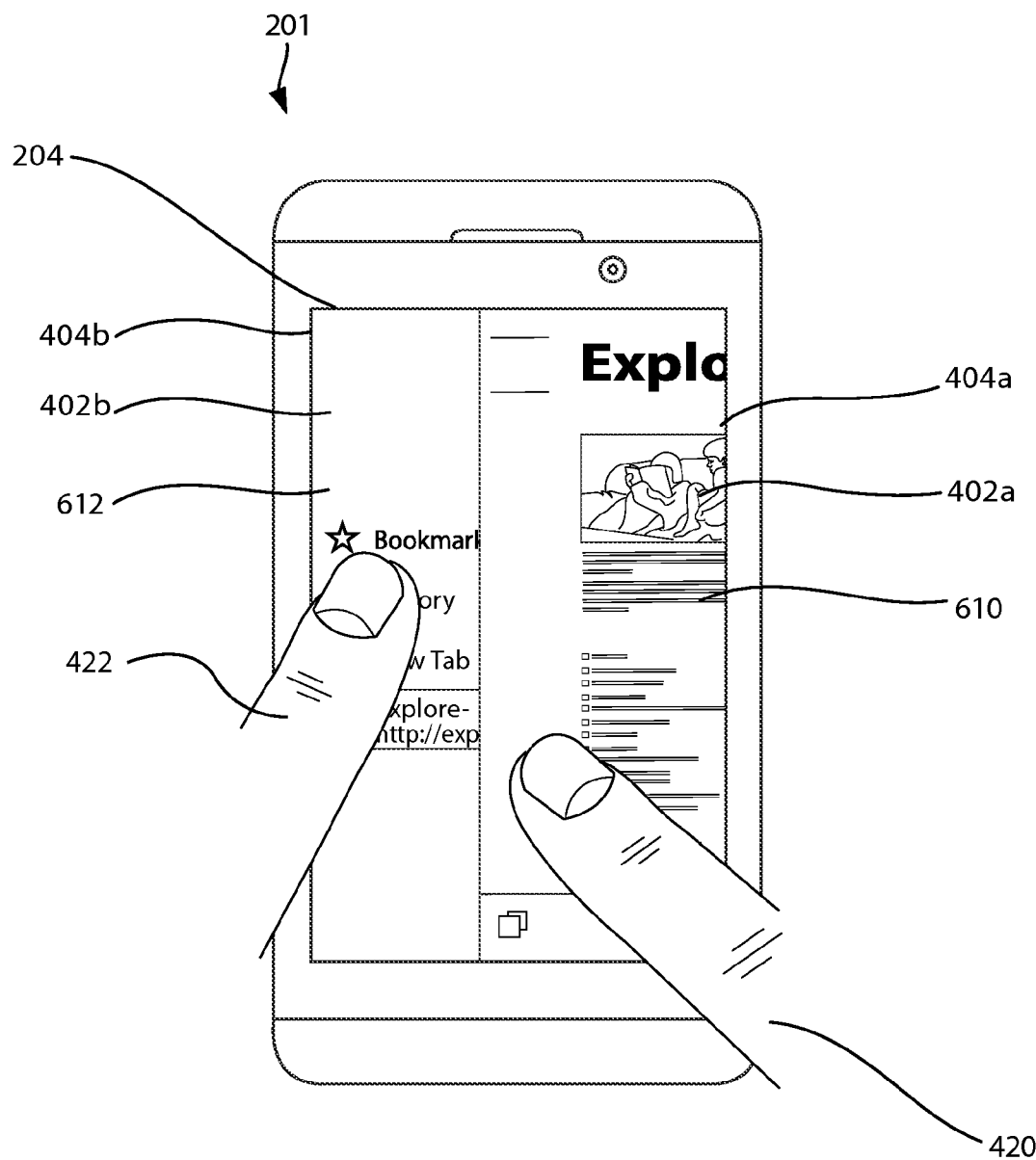
FIG. 5 is a further example embodiment of the example first display page and the second display page displayed on the touchscreen display.

Reference is next made to FIG. 5 which shows another example embodiment of the example first display page 402a on the first portion 404a of the touchscreen display 204 of the electronic device 201, and also the second display page 402b on the second portion 404b of the touchscreen display 204 of the electronic device 201. In the illustrated example of FIG. 5, the display pages are provided by a user interface for a web browser (such as, Google Chrome®). A web browser is an application for retrieving and displaying web pages from the World Wide Web and Web servers via networks, such as the internet. The web browser may also include an options list including one or more options associated with the web browser (such as, an option to bookmark a web page, an option to display a browsing history, an option to display another tab to access another web page, an option to forward the web page to another user (for example, via email) etc.). The one or more options are associated with one or more interface elements, and a selection of the one or more interface elements (for example, by an input from a user via an input interface 206) may initiate the one or more options related to the web browser (for example, a web browsing history may be displayed in response to the selection of the associated option).

In the illustrated example of FIG. 5, the first display page 402a is a web page 610 and the second display page 402b is an options list 612 including one or more options associated with the web browser. The one or more options are associated with one or more selectable interface elements. The first display page 402a (i.e. the web page 610) is shown to overlap a portion of the second display page 402b (i.e. the options list 612). Chording operations may be performed on the display pages. For example, the user may input the first touch gesture 420 on the first portion 404a displaying the web page 610, for example, by horizontally swiping and then maintaining stationary contact with the first portion 404a to input a slide and hold command to maintain the display of the web page 610 in a partially slid position. While inputting the first touch gesture 420, the user inputs the second touch gesture 422 on the second portion 404b displaying the options list 612, for example, by tapping an area of the second portion 404b corresponding to an interface element for an option to input a select command to select the interface element. Accordingly, a user may interact with the web page 610 on the first portion 404a while selecting the interface element for an option to initiate the option related to the web browser (for example, a selection of an interface element associated with a web browsing history may display the web browsing history on the second portion 404b).

Similarly, in at least some example embodiments, the display pages are provided by a user interface for a mapping application. A mapping application may in conjunction with the GPS 266 display a map that includes the current or past locations of the electronic device 201. The mapping application may also include an options list including one or more options associated with the mapping application (such as, an option to indicate nearby landmarks, an option to indicate traffic information, an option to indicate driving directions and/or estimated arrival time between a current location and a planned destination, etc.). The one or more options are associated with one or more interface elements, and a selection of the one or more interface elements (for example, by an input from a user via an input interface 206) may initiate the one or more options related to the mapping application (for example, traffic information may now be displayed in response to the selection of the associated option).

In at least some example embodiments, the first display page 402a may be a map and the second display page 402b may be an options list including one or more options associated with the mapping application. The one or more options are associated with one or more selectable interface elements. Similarly, chording operations may be performed on the display pages. For example, the user may input the first touch gesture 420 on the first portion 404a displaying the map, for example, by horizontally swiping and then maintaining stationary contact with the first portion 404a to input a slide and hold command to maintain the display of the map in a partially slid position. While inputting the first touch gesture 420, the user inputs the second touch gesture 422 on the second portion 404b displaying the options list, for example, by tapping an area of the second portion 404b corresponding to an interface element for an option to input a select command to select the interface element. Accordingly, a user may interact with the map on the first portion 404a, while selecting the interface element for an option to initiate the option related to the mapping application (for example, a selection of an interface element associated with an indication of traffic information may display traffic information).

Similarly, in at least some example embodiments, the display pages are provided by a user interface for a social media application (such as, Facebook®). A social media application may include social web pages that may be retrieved (from web servers via the internet) and displayed by a web browser. The social media application may also provide an options list including one or more options associated with the social media application (such as, an option to access a message platform, an option to access a list of friends, an option to access news feeds, an option to access events, etc.). The one or more options are associated with one or more interface elements, and a selection of the one or more interface elements (for example, by an input from a user via an input interface 206) may initiate the one or more options related to the social media application (for example, a message platform may be initiated in response to the selection of the associated option).

In at least some example embodiments, the first display page 402a may be social web page and the second display page 402b may be an options list including one or more options associated with the social media application. The one or more options are associated with one or more selectable interface elements. Similarly, chording operations may be performed on the display pages. For example, the user may input the first touch gesture 420 on the first portion 404a displaying the social web page, for example, by horizontally swiping and then maintaining stationary contact with the first portion 404a to input a slide and hold command to maintain the display of the social web page in a partially slid position. While inputting the first touch gesture 420, the user inputs the second touch gesture 422 on the second portion 404b displaying the options list, for example, by tapping an area of the second portion 404b corresponding to an interface element for an option to input a select command to select the interface element. Accordingly, a user may interact with the social web page on the first portion 404a, while selecting the interface element for an option to initiate the option related to the social media application (for example, a selection of an interface element associated with a message platform may display the message platform on the second portion 404b).

In at least some example embodiments, the display pages are provided by a user interface for an image application. An image application may display images as well as allow images to be modified or deleted. In such example embodiments, the first display page may be a first image and the second display page may be a second image. Similarly, chording operations may be performed on the displayed images. More particularly, a chording operation to tag the images may be performed (i.e. associating metadata to the images, for example, to rate the images). For example, the user may input the first touch gesture 420 on the first portion 404a displaying the first image, for example, by performing a zooming-in gesture to input a first tagging command to associate the first image with a first tag (such as, to tag the image with an "unlike" rating). While inputting the first touch gesture 420, the user inputs the second touch gesture 422 on the second portion 404b displaying the second image, for example, by performing a zooming-out gesture to input a second tagging command to associate the second image with a second tag (such as, to tag the image with a "like" rating). Accordingly, a user may simultaneously tag the images while viewing them.

In at least some example embodiments, a chording operation that corresponds to a scroll and tag may be performed on the displayed images. For example, the user may input the first touch gesture 420 on the first portion 404a displaying the first image, for example, by performing a zooming-in gesture to input a tagging command to tag the first image, and then a horizontal swipe gesture to input a scrolling command. In such example embodiments, the scrolling command is to cause a scroll between the display pages, and accordingly, display the second display page on the second portion 404b. While inputting the first touch gesture 420, the user inputs the second touch gesture 422 on the second portion 404b displaying the second image, for example, by performing a zooming-out gesture to input a tagging command to tag the second image. Accordingly, a user may continuously tag images while scrolling through them.

It will be appreciated that other gestures may be performed to input other commands to manipulate the images (such as, commands to delete, save, copy, crop, etc. the images).

Figure 6:
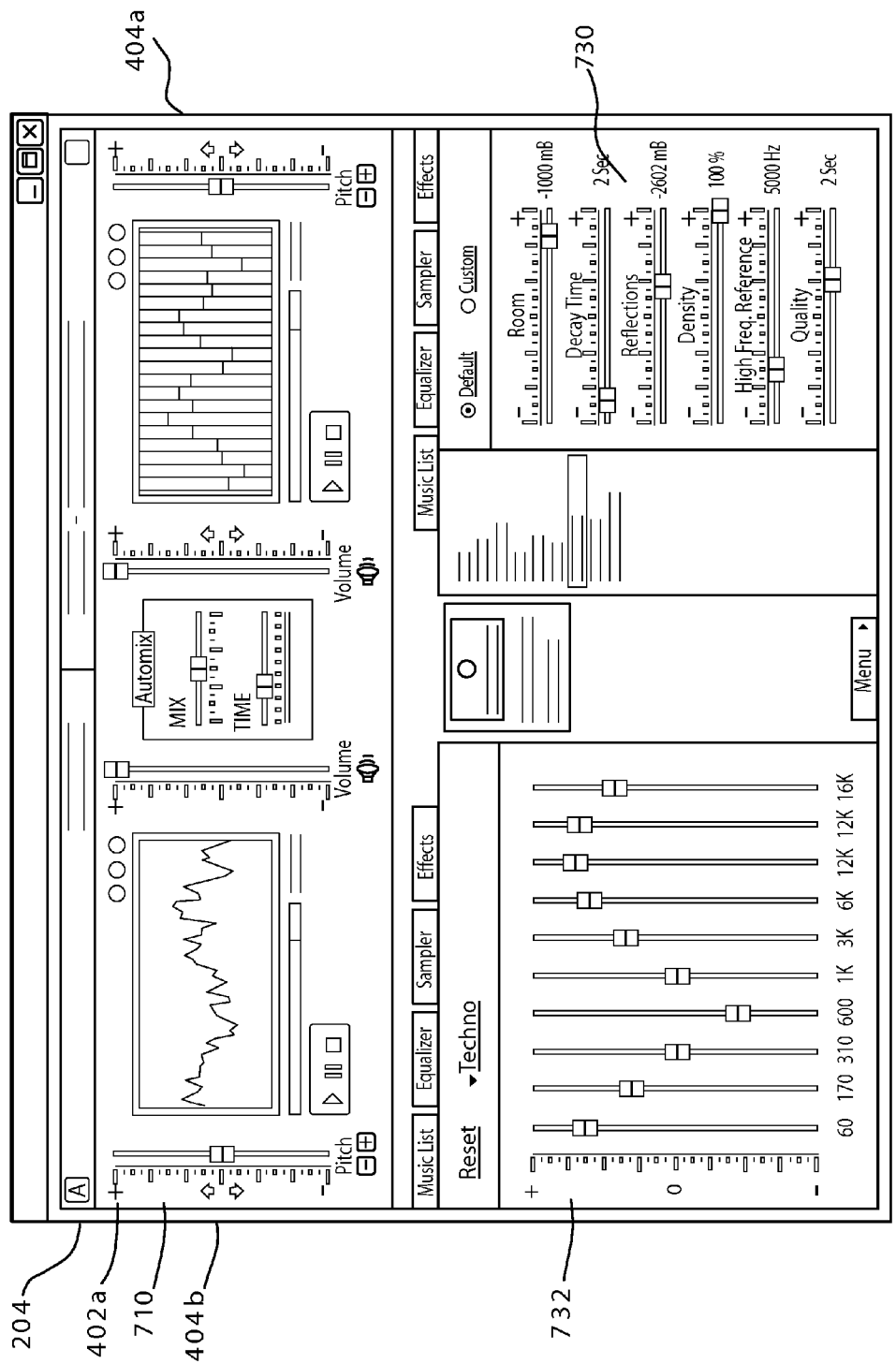
FIG. 6 is yet another example embodiment of the example first display page displayed on the touchscreen display.

Reference is next made to FIG. 6 which show an example embodiment of the example first display page 402 displayed on the first portion 404a and the second portion 404b of the touchscreen display 204. In the illustrated example of FIG. 5, the display page is provided by a user interface for an audio mixer application. An audio mixer application allows sounds to be combined into one or more channels to produce music. The content of the audio signals associated with the sounds may be varied, and effects such as reverb may be added. The audio mixer may accordingly provide an audio mixer page with at least one settings list including one or more settings (for example, the frequency, amplitude, dynamics, panoramic position, etc. settings associated with the audio mixer application). The one or more settings are associated with one or more interface elements that may be in the form of slider controls for adjusting the settings. A selection of the one or more interface elements (for example, by an input from a user via an input interface 206 to move an indicator of a slider control) may vary the one or more associated settings of the audio mixer page to produce varying audio content (for example, the frequency of the audio signals produced by the audio mixed application may be varied by moving the indicator of a slider control).

In the illustrated example of FIG. 5, the first display page 402a is an audio mixer page 710 that encompasses the first portion 404a and the second portion 404b of the touchscreen display 204. The audio mixer page includes a settings list including a plurality of first settings 730 and second settings 732. The first settings are associated with first selectable interface elements on the first portion 404a, and the second settings are associated with second selectable interface elements on the second portion 404b. Accordingly, the first portion 404a may receive gesture-based input to select the first interface elements and the second portion 404b may also receive gesture-based input to select the second interface elements. In performing chording operations, a user may, for example, input the first touch gesture 420 on the first portion 404a displaying the first settings 730, for example by pressing and swiping an area of the first portion 404a corresponding to a first interface element for a first setting 730 to input a select command to select the first interface element (in the illustrated example, the first interface elements include slider areas whose indicators are moved during a select command). While inputting the first touch gesture 420, the user inputs the second touch gesture 420 on the second portion 404b displaying the second settings 732, for example, by pressing and swiping an area of the second portion 404b corresponding to a second interface element for a second setting 730 to input a select command to select the second interface element (in the illustrated example, the second interface elements include slider controls whose indicators are moved during a select command). Accordingly, a user may simultaneously interact with portions of the audio mixer page 710 by selecting first interface elements and second interface elements for associated settings to vary the settings of the audio mixer page to produce varying audio content (for example, frequency settings on the first portion 404a may be simultaneously varied as amplitude settings on the second portion 404b during selection functions).

It will be appreciated that chording operations may be performed on the same applications 225 described above but with the display of different display pages, as well as on other applications 225 not specifically mentioned above. It will also be appreciated that other gestures may be input in either the first portion 404a or the second portion 404b of the touchscreen display 204 that correspond to commands to perform other functionalities (for example, copy and paste functions (as described above), cut and paste functions, etc.). The functions performed may depend upon the application user interfaces that provide the first display page 402a and the second display page 402b (the display pages may be associated with the same application 225 or different applications 225). Additionally, gestures to perform corresponding functions may be input in any combination on the first portion 404a and the second portion 404b of the touchscreen display 204 (for example, in at least some example embodiments, a portion of the first content within the first display page may be selected and copied, the first display page may then be slid and held to display the second display page (or a greater portion of the second display page) from underneath the first display page, the second display page may then be scrolled and finally, the selected and copied portion of the first content may be inserted within the second content of the second display page, with all of these functions performed as part of a chording operation).

While the present application is primarily described in terms of methods, a person of ordinary skill in the art will understand that the present application is also directed to various apparatus such as an electronic device 201 including a mobile communications device. The electronic device 201 includes components for performing at least some of the aspects and features of the described methods, which may be by way of hardware components (such as the memory 244 and/or the processor 240), software or any combination of the two, or in any other manner. Moreover, an article of manufacture for use with the apparatus, such as a pre-recorded storage device or other similar computer readable medium including program instructions recorded thereon may direct an apparatus to facilitate the practice of the described methods. It is understood that such apparatus and articles of manufacture also come within the scope of the present application.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

Example embodiments of the present application are not limited to any particular operating system, system architecture, mobile device architecture, server architecture, or computer programming language.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method implemented by a processor of an electronic device having a touchscreen display, the method comprising:
  detecting a first touch gesture on a first portion of the touchscreen display associated with a first control element, the first control element being associated with a first display page of an application which covers substantially all of the touchscreen display, wherein the first touch gesture includes:
    a horizontal swipe gesture to slide the first display page from over a second display page of the application, different from the first display page, to display at least a portion of the second display page, wherein content of the application displayed on the first display page corresponds to a selection of an interface element that is displayed on the second display page; and
    a continual press gesture to maintain the first display page at a partially slid position and prevent the first display page from sliding back over the second display page;
  detecting a second touch gesture on a second portion of the touchscreen display during the continual press gesture, the second portion of the touchscreen display being associated with a second control element different from the first control element, wherein the second control element is associated with the second display page; and
  while detecting the continual press gesture and detecting the second touch gesture, simultaneously,
    maintaining the first display page in the partially slid position, and
    causing a second event in the second portion of the touchscreen display in response to the second touch gesture.

2. The method of claim 1, wherein the first display page and the second display page are associated with an email application, the first display page defines a message and the second display page defines a message list associated with the message.

3. The method of claim 1, wherein the first display page and the second display page are associated with a calendar application, the first display page defines a calendar event and the second display page defines a calendar associated with the calendar event.

4. The method of claim 1, wherein the first display page and the second display page are associated with a presentation application, the first display page defines a presentation slide and the second display page defines a presentation slide list associated with the presentation slide.

5. The method of claim 1, wherein the first display page and the second display page are associated with a contact manager application, the first display page defines a contact record and the second display page defines a contact list associated with the contact record.

6. The method of claim 1, wherein the second display page includes one or more interface elements, and wherein the second touch gesture corresponds to a select command to select the one or more interface elements, and wherein the second event includes selecting the one or more interface elements.

7. The method of claim 6, wherein the first display page and the second display page are associated with a media player application, the first display page defines media content and the second display page defines one or more settings associated with the media content, the one or more settings are associated with the one or more interface elements, and wherein the selection of the one or more interface elements varies the one or more settings of the media content.

8. The method of claim 6, wherein the first display page and the second display page are associated with a video telephone application, the first display page defines video content and the second display page defines one or more settings associated with the video content, the one or more settings are associated with the one or more interface elements, and wherein the selection of the one or more interface elements varies the one or more settings of the video content.

9. The method of claim 6, wherein the first display page and the second display page are associated with a mapping application, the first display page defines a map and the second display page defines one or more options associated with the mapping application, the one or more options are associated with the one or more interface elements, and wherein the selection of the one or more interface elements initiates the one or more options.

10. The method of claim 6, wherein the first display page and the second display page are associated with a web browser, the first display page defines a web page and the second display page defines one or more options associated with the web browser, the one or more options are associated with the one or more interface elements, and wherein the selection of the one or more interface elements initiates the one or more options.

11. The method of claim 1, wherein the first control element is associated with a first display page that is displayed on the first portion of the touchscreen display, the first display page displaying a first still image, and the second control element is associated with a second display page that is displayed on the second portion of the touchscreen display, the second display page displaying a second still image, and wherein the first touch gesture corresponds to a first tagging command to associate a first tag with the first image, and the second touch gesture corresponds to a second tagging command to associate a second tag with the second image, and wherein the first event includes associating a first tag with the first image, and wherein the second event includes associating a second tag with the second image.

12. The method of claim 1, wherein the first display page occupies an entirety of the first portion and the second display page occupies an entirety of the second portion.

13. The method of claim 1, wherein the first and second display pages constitute an entirety of the touchscreen display.

14. The method of claim 1, wherein the second touch gesture corresponds to a scrolling command to scroll the second display page and wherein the second event includes scrolling the second display page.

15. The method of claim 1, wherein the first display page is configured to snap back to cover substantially all of the touchscreen display when the continual press gesture is released.

16. An electronic device comprising:
a memory;
a touchscreen display; and
a processor coupled with the memory and the touchscreen display, the processor configured to:
detect a first touch gesture on a first portion of the touchscreen display associated with a first control element, the first control element being associated with a first display page of an application which covers substantially all of the touchscreen display, wherein the first touch gesture includes:
a horizontal swipe gesture to slide the first display page from over a second display page of the application, different from the first display page, to display at least a portion of the second display page, wherein content of the application displayed on the first display page corresponds to a selection of an interface element that is displayed on the second display page; and
a continual press gesture to maintain the first display page at a partially slid position and prevent the first display page from sliding back over the second display page;
detect a second touch gesture on a second portion of the touchscreen display during the continual press gesture, the second portion of the touchscreen display being associated with a second control element different from the first control element, wherein the second control element is associated with the second display page; and
while detecting the continual press gesture and detecting the second touch gesture, simultaneously,
maintain the first display page in the partially slid position, and
cause a second event in the second portion of the touchscreen display in response to the second touch gesture.

17. The electronic device of claim 16, wherein the first display page is configured to snap back to cover substantially all of the touchscreen display when the continual press gesture is released.

18. A non-transitory computer readable storage medium comprising computer executable instructions which, when executed, configure a processor to:
detect a first touch gesture on a first portion of a touchscreen display associated with a first control element, the first control element being associated with a first display page of an application which covers substantially all of the touchscreen display, wherein the first touch gesture includes:
a horizontal swipe gesture to slide the first display page from over a second display page of the application, different from the first display page, to display at least a portion of the second display page, wherein content of the application displayed on the first display page corresponds to a selection of an interface element that is displayed on the second display page; and
a continual press gesture to maintain the first display page at a partially slid position and prevent the first display page from sliding back over the second display page;
detect a second touch gesture on a second portion of the touchscreen display during the continual press gesture, the second portion of the touchscreen display being associated with a second control element different from the first control element, wherein the second control element is associated with the second display page; and
while detecting the continual press gesture and detecting the second touch gesture, simultaneously,
maintain the first display page in the partially slid position, and
cause a second event in the second portion of the touchscreen display in response to the second touch gesture.

19. The non-transitory computer readable storage medium of claim 18, wherein the first display page is configured to snap back to cover substantially all of the touchscreen display when the continual press gesture is released.

* * * * *